Feb. 11, 1941.  A. JACKSON ET AL  2,231,535
DECORATING APPARATUS
Filed June 3, 1938  10 Sheets-Sheet 8
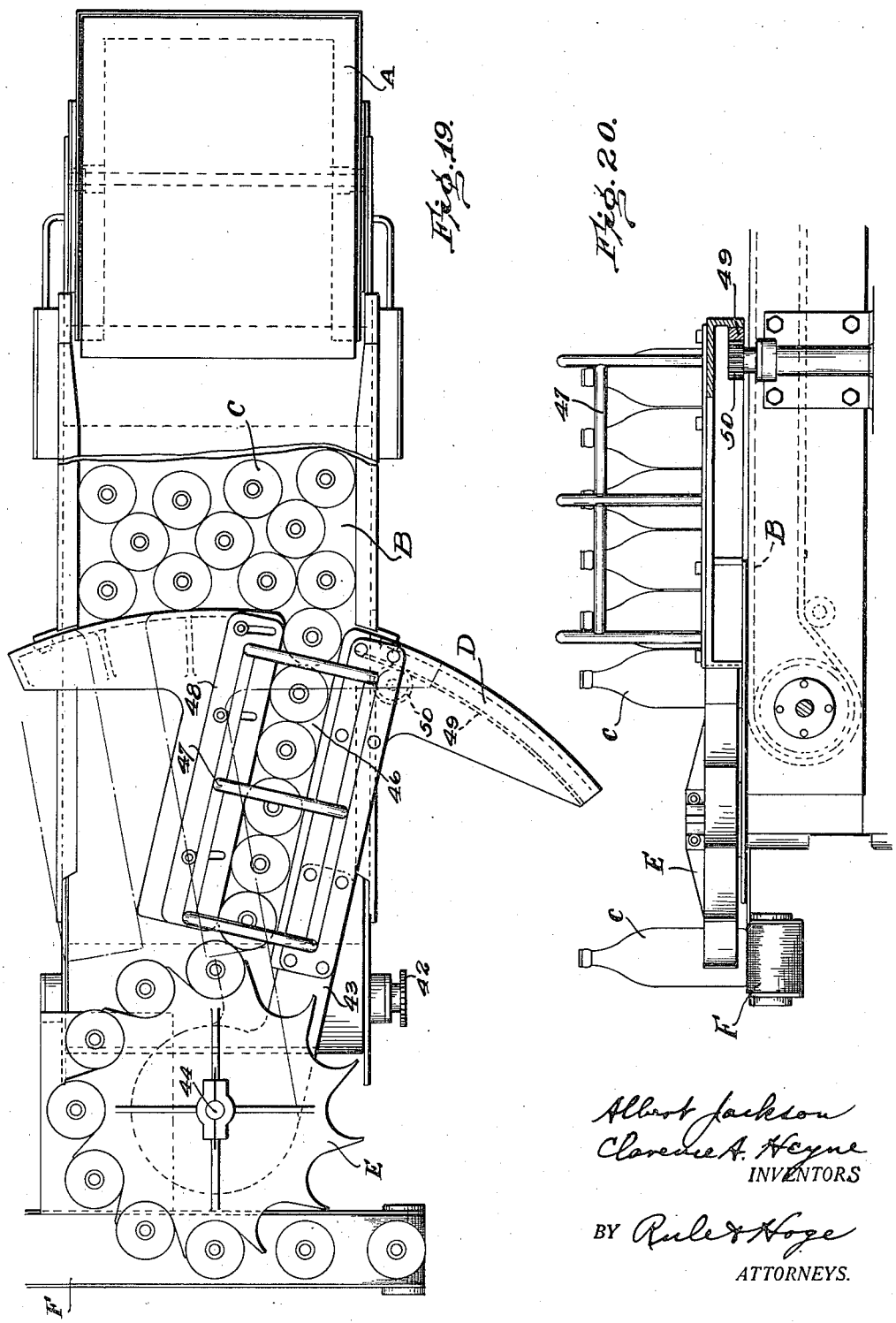
Albert Jackson
Clarence A. Heyne
INVENTORS
BY Rule & Hoge
ATTORNEYS.

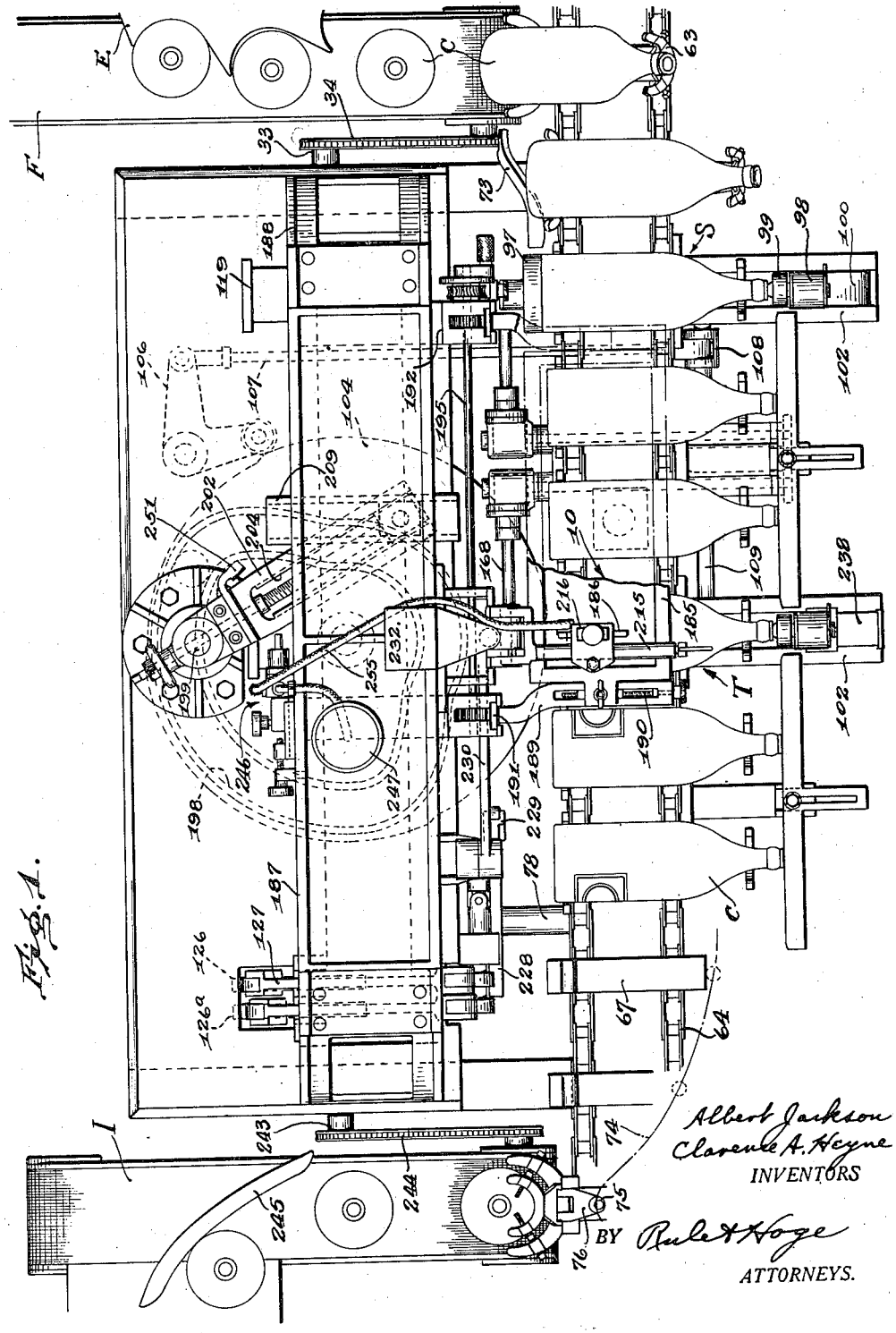

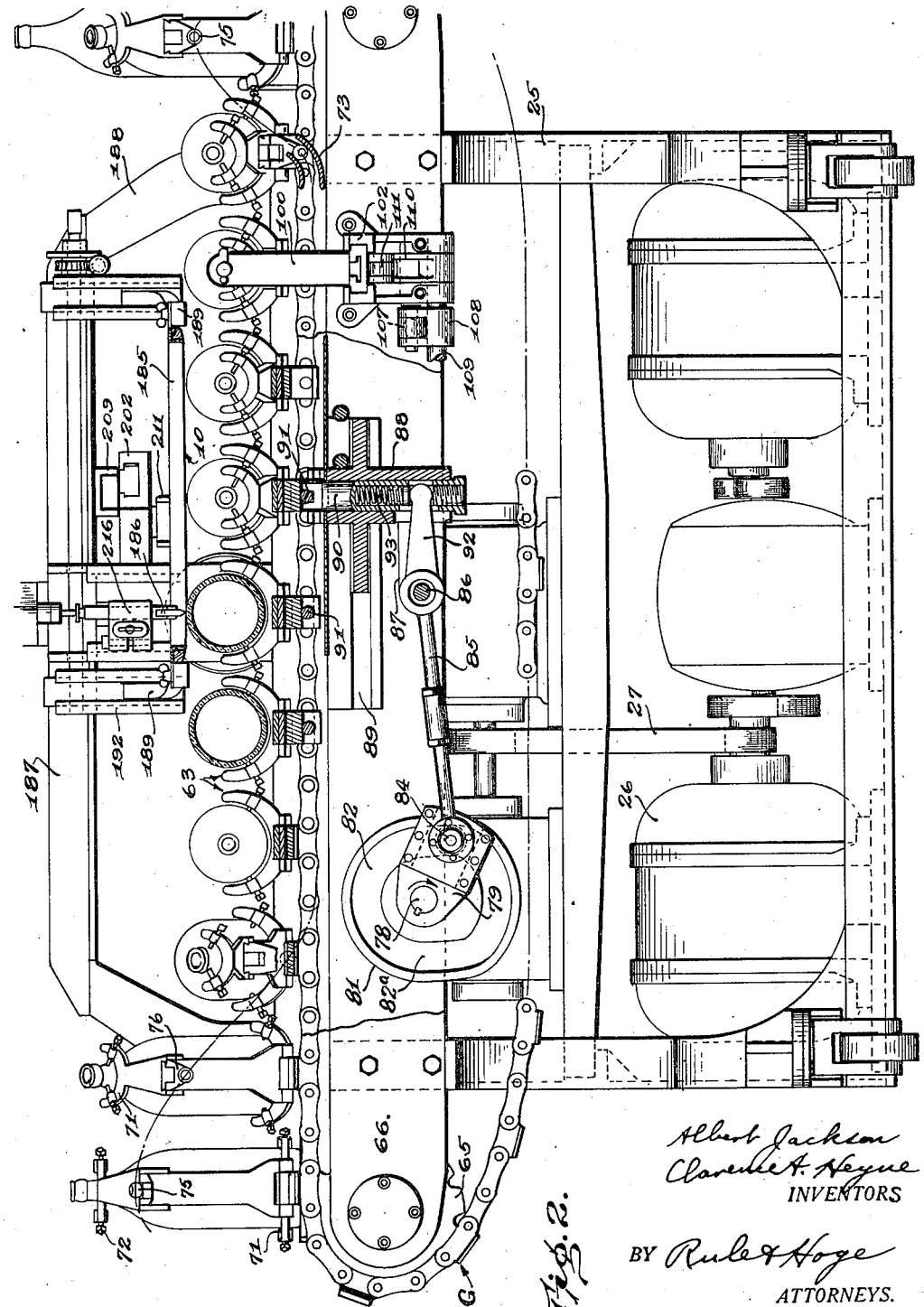

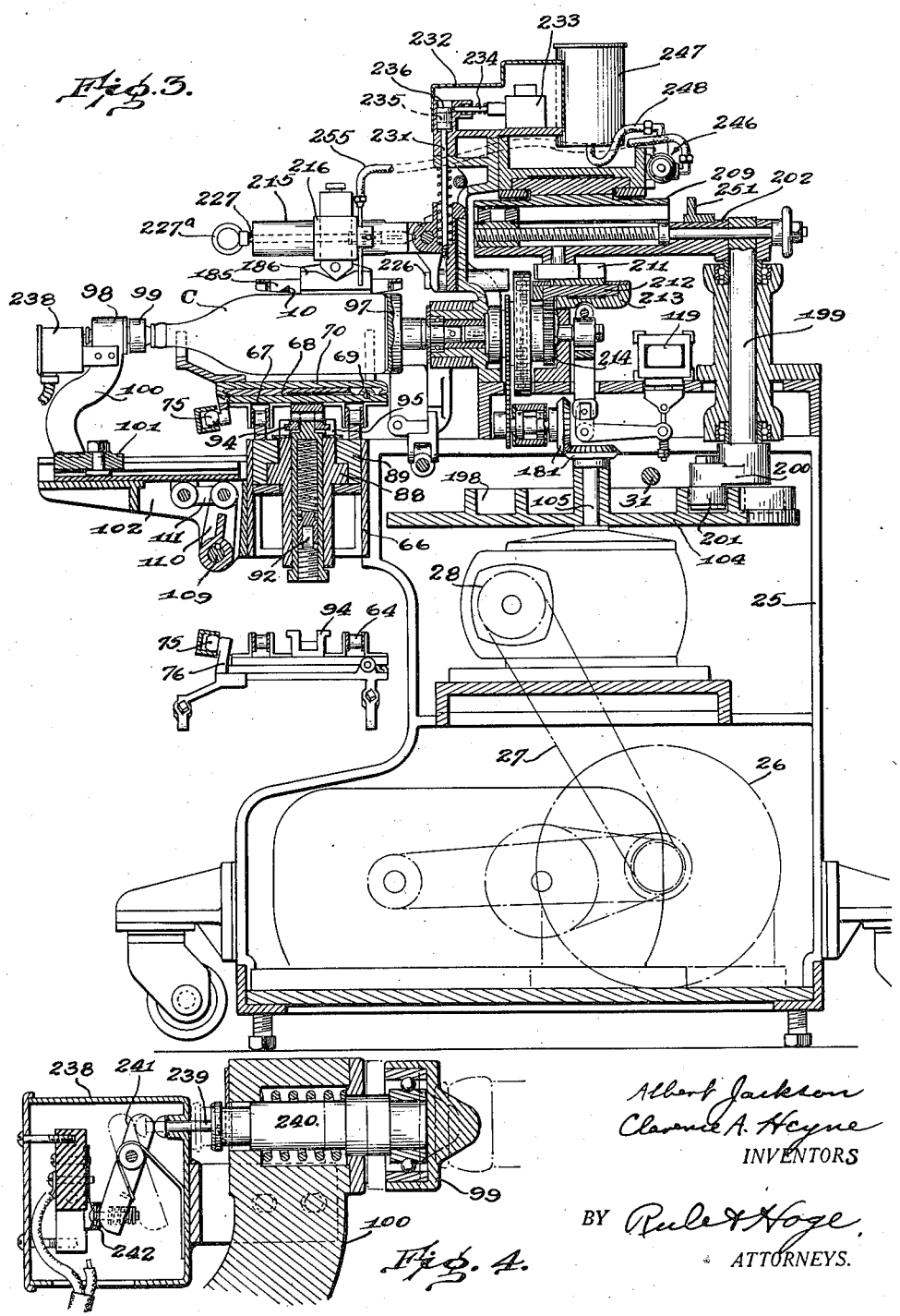

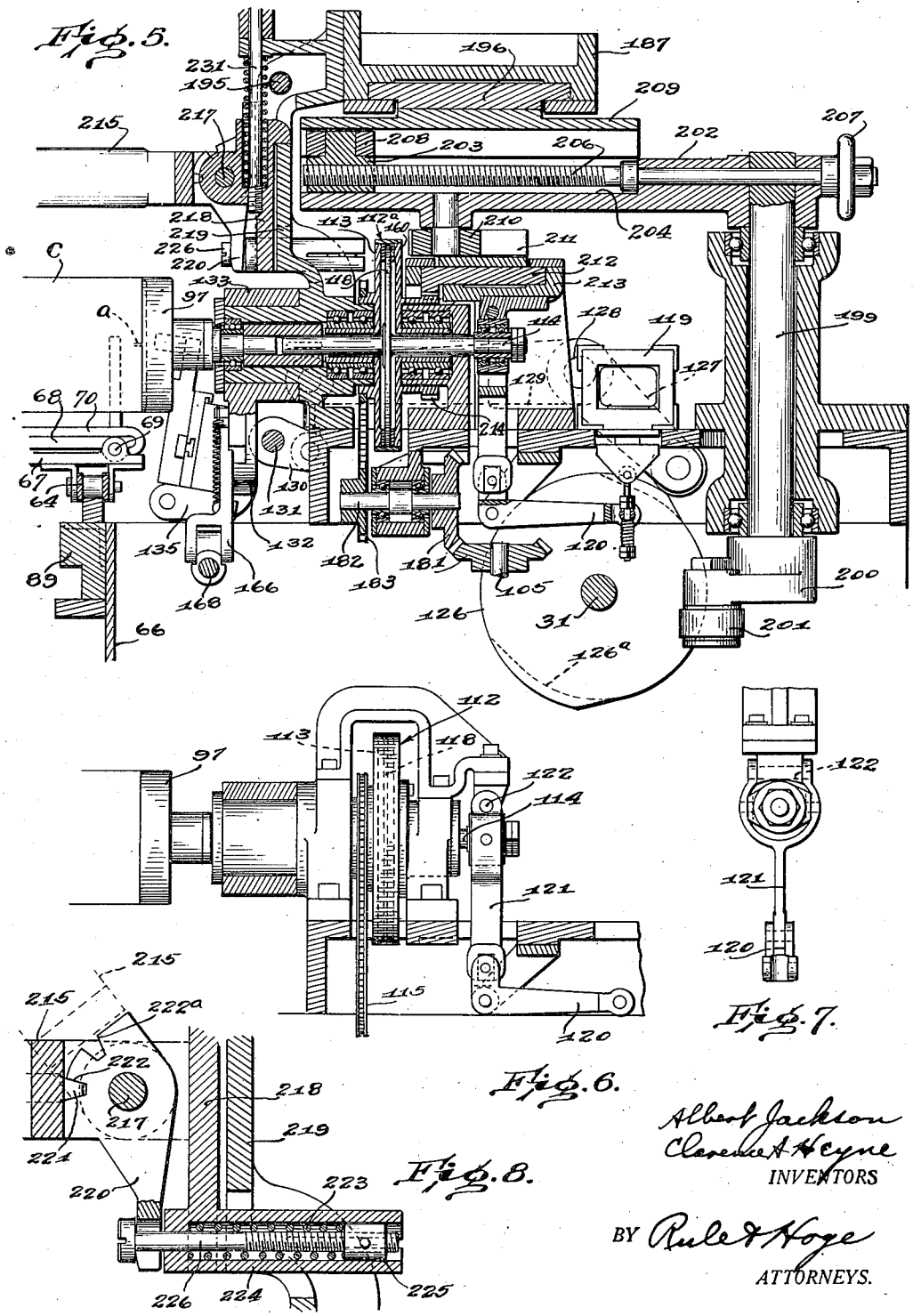

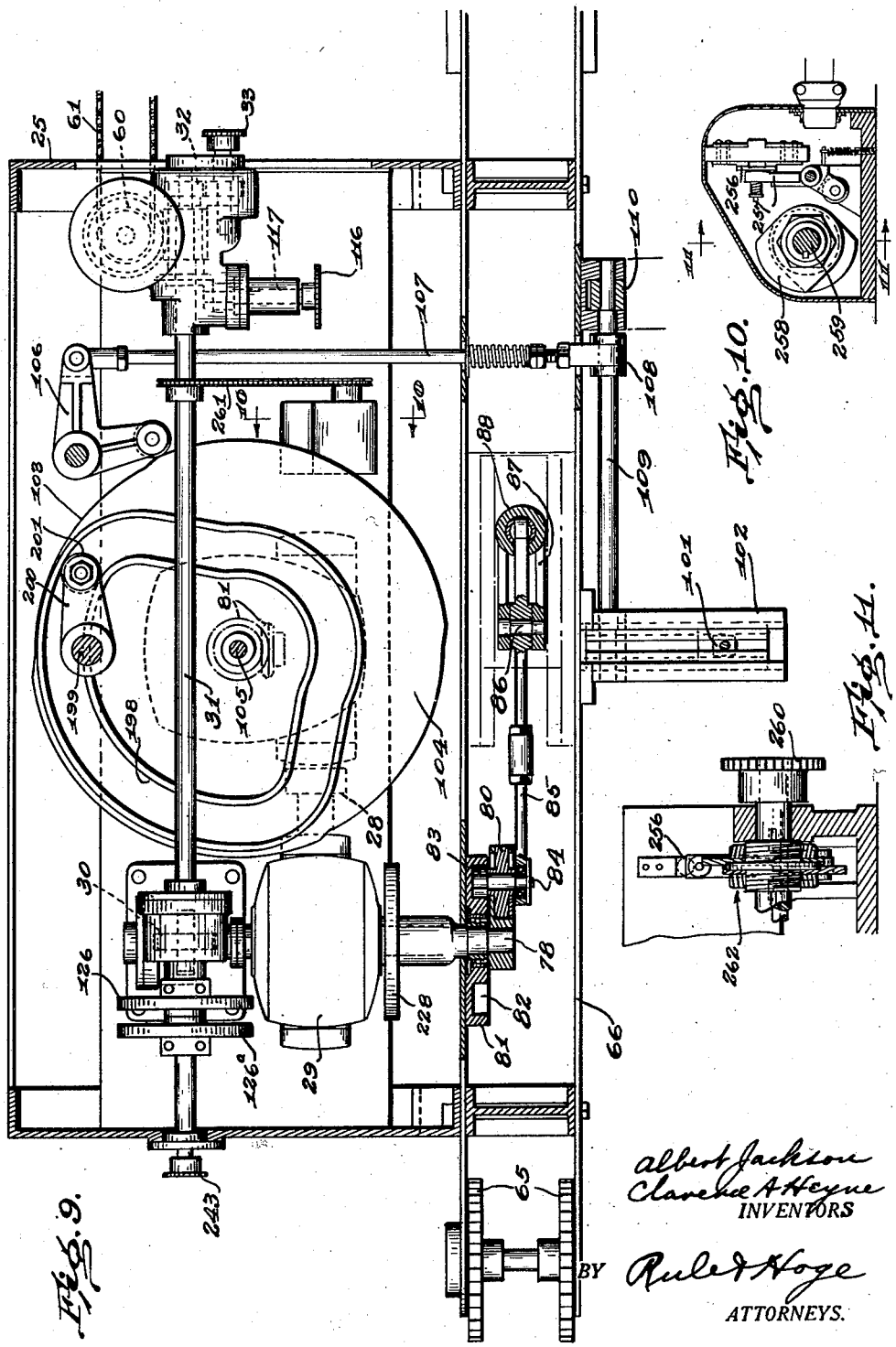

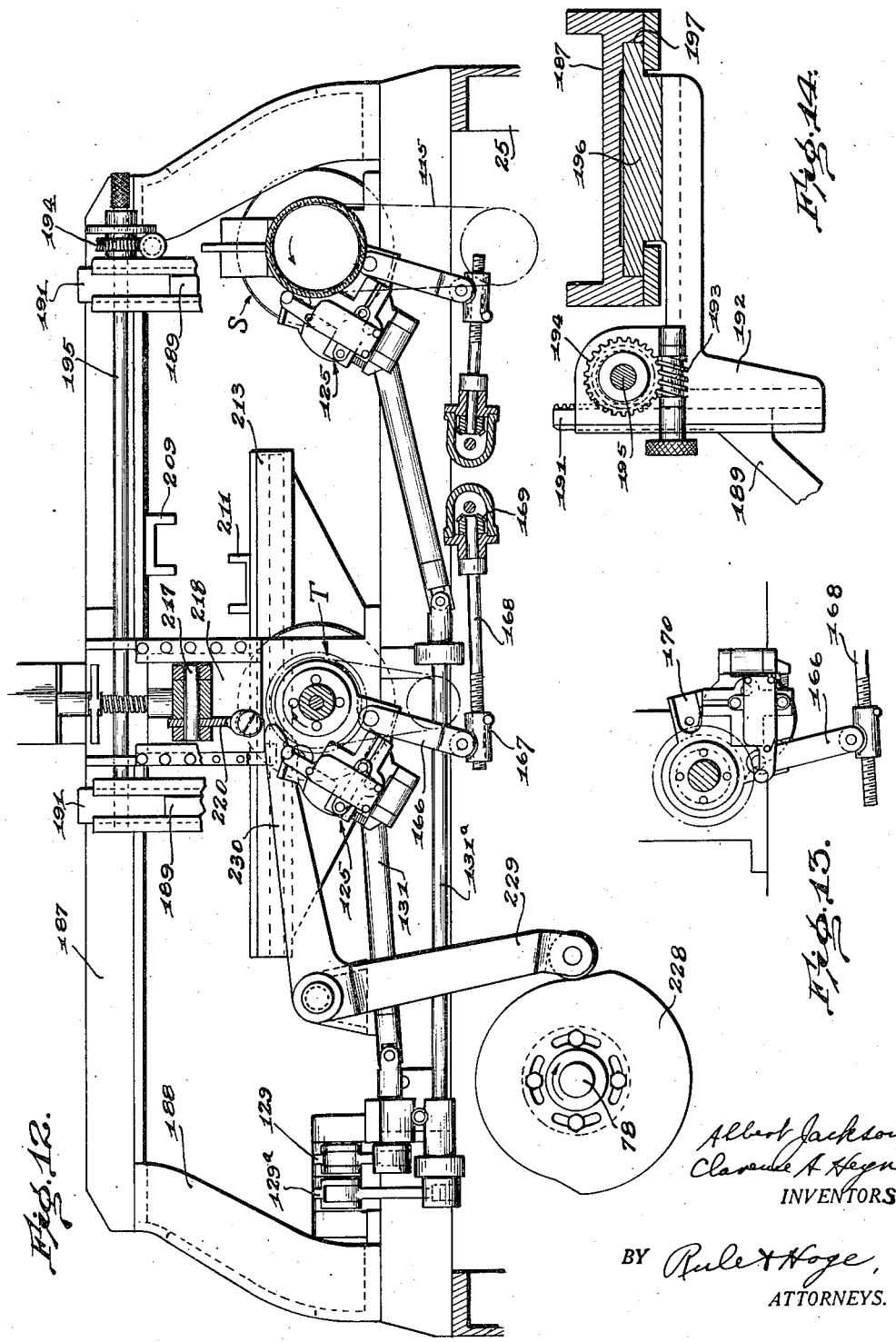

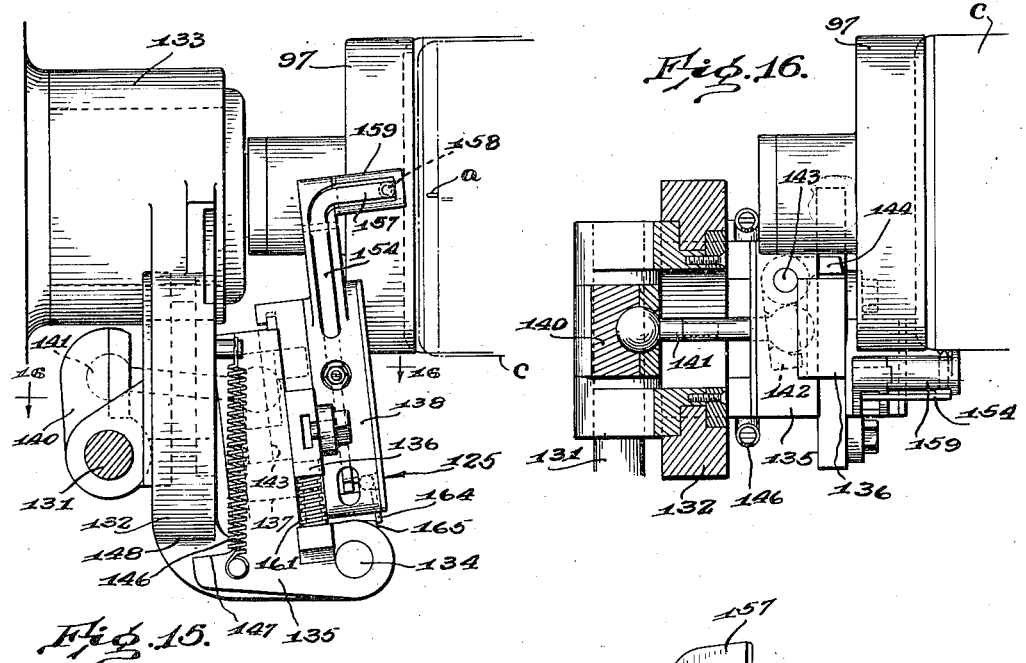

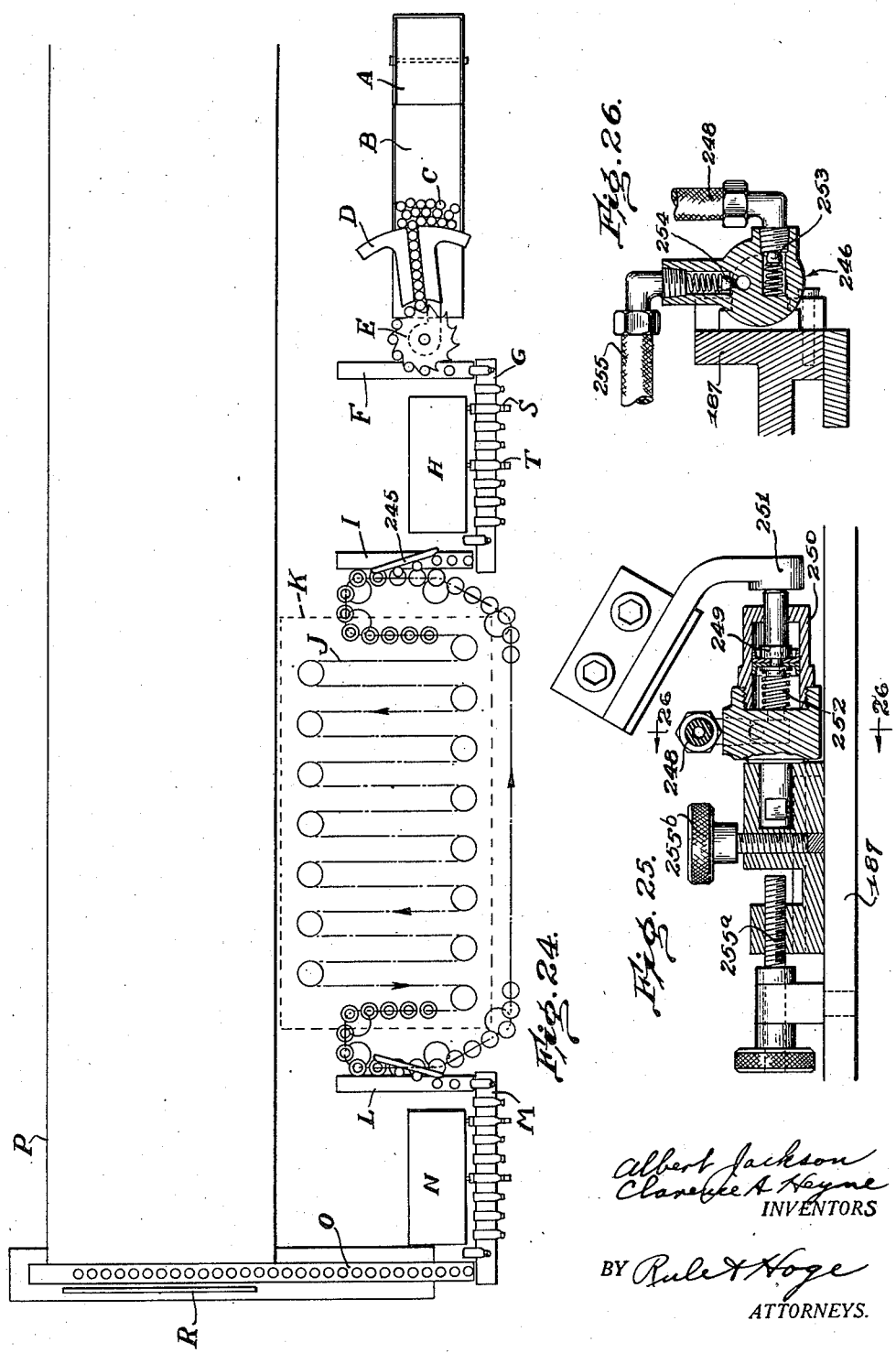

Patented Feb. 11, 1941

2,231,535

UNITED STATES PATENT OFFICE 2,231,535

DECORATING APPARATUS

Albert Jackson and Clarence A. Heyne, Alton, Ill., assignors to Owens-Illinois Glass Company, a corporation of Ohio Application June 3, 1938, Serial No. 211,626

26 Claims. (Cl. 101—115)

Our invention relates to apparatus for decorating the surfaces of articles and, more particularly, for applying color designs or decorations to the surfaces of articles by a screen process in which the coloring or decorating materials are applied to the surface of the article, as by stenciling through a screen or the like.

An object of the invention is to provide an improved apparatus which is entirely automatic in its operation, designed for decorating an article with a plurality of different colors applied in succession to the article for producing plural or multiple color designs, or otherwise applying a plurality of designs in succession in a predetermined relation.

In its preferred form, the invention provides an apparatus by which bottles or other articles to be decorated are automatically delivered to cradles on an endless conveyor which is advanced step by step, bringing the articles, first, to the registering mechanism by which each article is rotated to a predetermined position thereby determining the position on the surface of the article at which the decoration will be applied, then advancing the article while on said conveyor to a decorating unit and applying a color design or the like, thereafter transferring the article to other conveying means and carrying it through a drying oven for drying the applied coloring material, then advancing the article to a second decorating unit for applying a second color, and finally carrying the article into and through a lehr or oven by which the coloring material is fused into the article to form a permanent color design.

A further object of the invention is to provide improved automatic means for feeding the articles to the cradle conveyor.

A further object of the invention is to provide novel means for aligning the articles with rotating chucks and causing the chucks to rotate the articles to predetermined positions which determine the position of the decoration on the surface of the article and permit the application of successive color designs in proper predetermined relation.

Other objects of the invention will appear hereinafter.

Referring to the accompanying drawings:

Fig. 1 is a plan view of a decorating machine or unit and adjacent parts of the apparatus, constructed in accordance with the principles of our invention;

Fig 2 is a part sectional elevation of such apparatus, parts being broken away;

Fig. 3 is a transverse vertical section at the decorating station;

Fig. 4 is a fragmentary sectional view on an enlarged scale, showing an electrical switch control by which the squeegee is held inoperative when an empty cradle is presented at the decorating station;

Fig. 5 is a vertical sectional view showing particularly the chuck and cooperating mechanism for effecting the final registration adjustments of the articles at the decorating station;

Fig. 6 is a part sectional elevation of mechanism controlling the first registration operation;

Fig. 7 is an elevational view of the levers shown in Fig. 6 for operating the chuck, clutch and brake;

Fig. 8 is a detail view in vertical section, showing mechanism for applying an adjustable tension to the squeegee;

Fig. 9 is a sectional plan view of the machine drive mechanism;

Fig. 10 is a vertical section at the line 10—10 on Fig. 9, showing a timer including an electric switch controlling the decorating mechanism;

Fig. 11 is a sectional view of the same at the line 11—11 on Fig. 10;

Fig. 12 is a part sectional elevation showing particularly the finger devices controlling the registration adjustments of the articles;

Fig. 13 is a detail showing an optional position of one of the finger mechanisms;

Fig. 14 is a detail sectional elevation showing mechanism for adjusting the height of the screen;

Figs. 15 to 18 illustrate finger mechanism controlling registration adjustments of the articles;

Fig. 15 is a side elevation of such mechanism;

Fig. 16 is a horizontal section at the line 16—16 on Fig. 15;

Fig. 17 is a part sectional elevation looking in a direction at right angles to that of Fig. 15 and showing the electrical contact mechanism within the finger;

Fig. 18 is a perspective view of a switch lever and associated parts;

Fig. 19 is a plan view of the loading conveyor and associated mechanism;

Fig. 20 is a part sectional side elevation of a portion of the mechanism shown in Fig. 19;

Fig. 24 is a diagrammatic view illustrating one arrangement of the apparatus including a pair of decorating units with an intermediate drying oven and a lehr for the final firing operation;

Fig. 25 is a longitudinal sectional view through an automatic mechanism for supplying paint or color pigment to the screen; and Fig. 26 is a transverse section of the same at the line 26—26 on Fig. 25.

Figure 21:
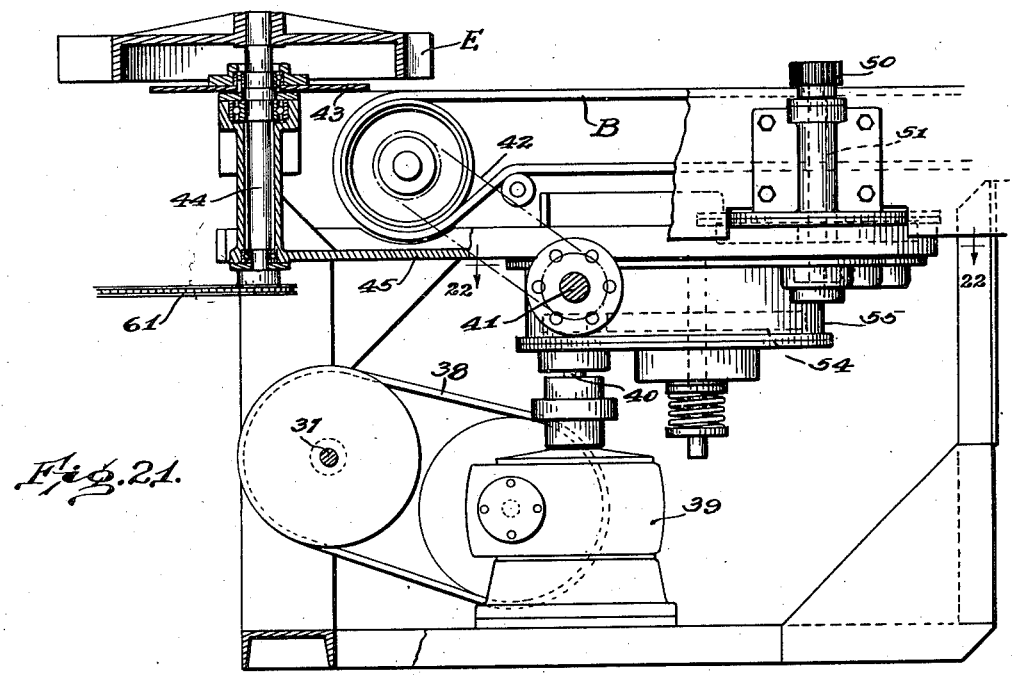
Fig. 21 is a part sectional elevation showing the loading conveyor and associated mechanisms.

The apparatus as herein illustrated is particularly adapted for applying two-color decorations to the cylindrical surfaces of bottles or other articles, said apparatus including two decorating units, each of which operates automatically to apply one of the colors, the articles being carried through suitable drying mechanism between the operations of the two machines. It will be understood, however, that the invention is not limited to apparatus for applying two-color decorations, and also many features of the invention are applicable in apparatus for applying a single color design or the like. The decorating machines or units are of the screen type in which a silk screen 10 or other screen (Figs. 1, 2 and 3) is arranged to advance over the surface to be decorated, said surface being in rolling contact with the screen, while the decorating material is forced, by means of a squeegee, through a porous portion of the screen corresponding to the required design. Various conventional features of the decorating mechanism are not herein illustrated in detail.

The general arrangement of the apparatus will be understood by reference to Fig. 24 which illustrates diagrammatically a loading platform A, a loading conveyor B which receives the articles C from the platform, a selector bar D by which the articles are selected and directed to an indexing or star wheel E, a loading belt F on which the articles are placed and uniformly spaced by the star wheel, and a cradle conveyor G provided with cradles to which the articles are transferred from the loading belt F. The cradle conveyor G is driven intermittently so that each article is advanced step by step along a decorating machine H. Each article before it reaches the decorating screen 10 is rotated automatically to such position that proper registration of the screen with the surface of the article to be decorated will be obtained, the extent of such rotation being dependent upon the particular rotative position of the article at the time it is deposited on a conveyor cradle. After such registration, the decorating machine operates to apply a color decoration to the article. After the articles pass beyond the decorating machine H they are transferred to a conveyor I and thence to a conveyor J by which they are caused to travel in a zigzag path through a preliminary drying oven K. After passing through said oven they are transferred from the conveyor J to a loading belt L and from the latter are deposited in cradles on a cradle conveyor M. The conveyor M may operate in the same manner as the conveyor G so that the articles are caused to traverse a second decorating machine N which applies a second color or design to the articles. The articles are then transferred from the cradle conveyor M to a cross belt or conveyor O by which the articles are carried across the end of a lehr P and from which they are transferred to the lehr conveyor by a pusher bar R of conventional construction and operation.

The decorating unit H is mounted on a supporting frame 25 (Figs. 2 and 3) within which is mounted an electric motor 26 which may run continuously. Driving connections from the motor to the loading belt F include a sprocket chain 27 which drives a sprocket wheel 28 (Figs. 3 and 9), the latter having driving connections through speed reduction gearing, within a gear box 29, and worm gearing 30 to a drive shaft 31. The drive shaft is connected through gearing 32 to a sprocket wheel 33 (Figs. 9 and 1), said sprocket wheel 33 operating through a sprocket chain 34 to drive the loading belt F.

Figure 23:
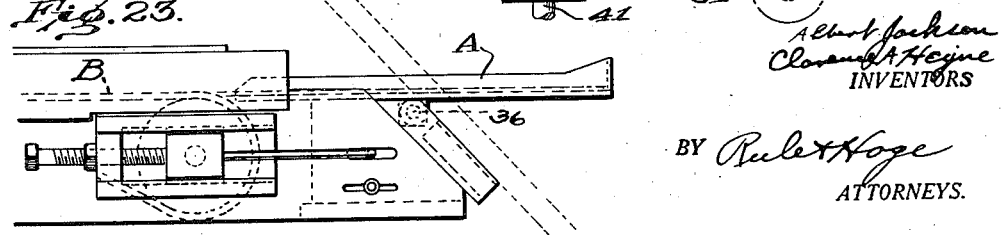
Fig. 23 is a detail view showing the loading platform and means for adjusting the loading conveyor.

The loading platform A (see Figs. 19 and 23) is mounted to tilt about a pivot 36 and is adapted to receive a case of bottles C which are transferred therefrom to the loading conveyor B which is continuously driven. Any suitable means may be employed for driving the conveyor B, as, for example, an electric motor (not shown) connected to a drive shaft 37 (Fig. 21) having driving connections, through a belt 38 and speed reduction gearing within a gear box 39, with a vertical shaft 40, the latter having a driving connection with a horizontal shaft 41 operating through a sprocket and chain drive 42 to drive the conveyor B.

The selector bar D includes an arm 43 by which the bar is pivotally mounted to oscillate about the axis of a vertical shaft 44 (Figs. 19 and 21), on which the star wheel is mounted, said shaft being journaled in a frame 45 which carries the loading platform. The selector bar is made in sections spaced to provide a channel or guideway 46 through which the articles C are guided to the star wheel E. Said sections are connected by a skeleton frame 47. One of said sections includes an adjusting bar 48 by which the width of the channel 46 may be adjusted to correspond with the size of the articles passing therethrough.

Figure 22:
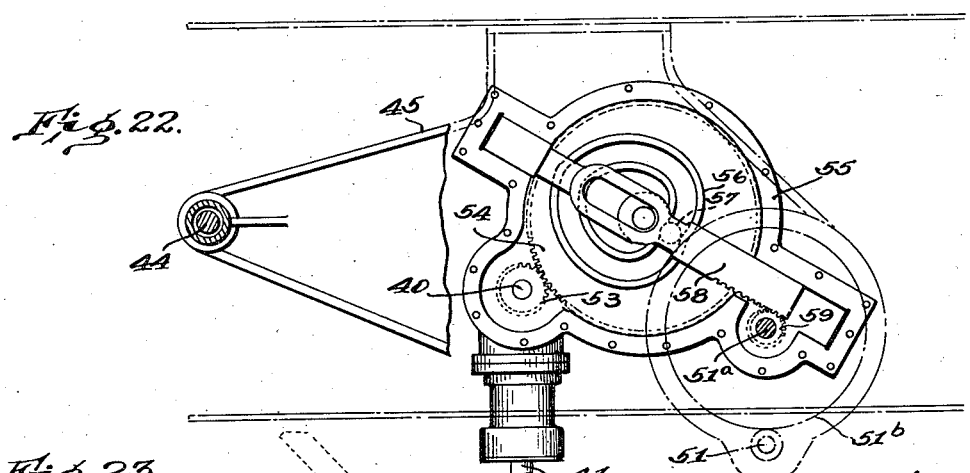
Fig. 22 is a horizontal section at the line 22—22 on Fig. 21, showing driving mechanism for reciprocating the selector bar.

The selector bar D is oscillated by mechanism including an arc-shaped rack bar 49 (Figs. 19 and 20) concentric with the shaft 44, the front face of the selector bar also being concentric with said shaft. The rack bar is driven by a pinion 50 on a vertical shaft 51 which is intermittently driven in opposite directions by mechanism shown in Figs. 21 and 22. Such mechanism includes a pinion 53 on a shaft 40, said pinion driving a gear 54 within a gear casing 55. A cam 56, fixed to the gear 54, is formed with a cam track in which runs a cam roll 57 carried on a rack bar 58 mounted to reciprocate lengthwise in bearings within the casing 55, under the control of the cam 56. The rack bar drives a pinion 59 on a shaft 51$^a$ which has driving connection through gearing 51$^b$ with the shaft 51, thereby intermittently rotating the shaft 51 in opposite directions and oscillating the selector bar D.

The star wheel E is driven continuously, having driving connections with the drive shaft 31 (Fig. 9). Said driving connections include a worm gear drive 60 between the shaft 31 and a sprocket chain 61 (Figs. 9 and 21), the latter having driving connection with the star wheel shaft 44. The bottles C are transferred by the star wheel from the conveyor B to the loading belt F and uniformly spaced thereon.

The bottles are carried forward on the loading belt to the cradle conveyor G and transferred to cradles 63 thereon. The cradle conveyor comprises a pair of parallel endless chains 64 horizontally spaced and trained over sprocket wheels 65 mounted on shafts journaled in the ends of frame bars 66 mounted on the frame 25. Cross bars 67 are arranged at intervals along the conveyor chains and provide supports for the cradles, the cross bars being connected at each end to the chains.

Each cradle (see Figs. 3 and 5) comprises a bar 68 overlying a supporting bar 67 and connected thereto by a pivot 69 adjacent the inner end of the cradle, permitting the cradle to swing up and down, as hereinafter described. The cradle includes a bar 70 overlying the bar 68 and removably attached thereto, permitting the substitution of other cradles corresponding to the size and shape of the particular article which is to be carried thereby. The cradle includes supporting arms or yokes 71 (Fig. 2) provided with supporting pins 72 adjustable thereon to correspond to the size and shape of the article to be carried thereby.

Tilting movement of the cradles is effected by means of stationary cam tracks 73 and 74 located adjacent the ends of the cradle conveyor. Cam rolls 75 (see Fig. 3) carried on arms 76 on the cradles, are arranged to run on the cams 73 and 74. The cam 73 is so shaped that each cradle when brought in line with the loader belt F is held by the cam in inclined position to receive a bottle C as the latter is tilted off the belt F. The cradle conveyor is held stationary during the transfer of each bottle to a cradle thereon. After a bottle has passed the decorating mechanism it is swung to an upright position by the cam 74 and thereby transferred to the belt conveyor I.

Referring to Figs. 2 and 9, mechanism is provided for driving the cradle conveyor intermittently step by step, each step movement advancing the conveyor the distance between the centers of two adjoining cradles. Such mechanism includes a shaft 78 extending from the gear box 29 and having driving connection with the shaft 31 for rotating it continuously. A crank 79 is keyed to the shaft 78 and has mounted therein for radial movement a crosshead 80. A stationary cam 81 mounted on a conveyor frame bar 66, is formed with a cam track 82 in which runs a cam roll 83 on a pivot pin 84 mounted on the crosshead 80. A connecting rod 85, which also functions as a lever, is fulcrumed on a pivot pin 86 mounted in lugs 87 formed on a connecting head 88. The latter is mounted to reciprocate lengthwise of the conveyor in guides 89 mounted in the conveyor frame 66. Mounted for vertical reciprocating movement in the head 88 is a hollow plunger 90, the upper end of which is forked to engage pins 91 carried by and individual to the cradles. The connecting rod or lever 85 includes an arm 92 for reciprocating the plunger 90. A spring 93 mounted in the hollow plunger provides a yielding connection permitting the plunger to be moved upward with a yielding pressure.

The shaft 78 is rotated in a clockwise direction (Fig. 2) so that as the crank 79 advances from the position shown in Fig. 2, the connecting head 88 is moved forward thereby advancing the cradle conveyor which at this time has driving connection with the head 88. As this forward step movement of the conveyor is completed the cam roll 83 enters an approximately vertical portion 82ª of the cam track and as it moves upward therein the connecting rod 85 swings about its fulcrum and through the arm 92 moves the plunger 90 downward thereby releasing it from the pin 91. The conveyor is thus disengaged and remains stationary while the connecting head 88 is returned or moved to the right by the continued rotation of the crank 79. The plunger 90 is then lifted into driving engagement with the next succeeding cradle unit as the cam roll travels downward to the Fig. 2 position.

It will be noted that each step movement of the conveyor is effected during the rotation of the crank 79 through substantially less than a half revolution so that the conveyor is at rest during comparatively long intervals. This gives ample time for the various operations effected during such rest periods, including the rotation of the bottles for registration purposes and during the decorating operation.

While the cradle is in register with the head 88, it is held against upward movement relative thereto by means of lugs 94 (Fig. 3) carried on the cradle and which engage channel shaped holding pieces 95 on the connecting head 88. In this manner, lifting of the cradle by the plunger 90 is positively prevented and a proper connection of the plunger with the pin 91 is insured, while the spring 93 serves as a safety means in the event that the upward movement of the plunger 90 is obstructed through failure to register with the pin 91.

The registration mechanisms and their operations by which each article is oriented or rotated to a predetermined position for registration with the decorating means, will now be described. Such rotative adjustment is desirable, for example, in decorating bottles which ordinarily have mold seams or slight ridges extending lengthwise of the bottle at opposite sides thereof. The present invention provides automatic means for rotatively positioning the bottles, preliminary to the decorating operation, so that the decoration will be applied in a predetermined position relative to said seams. Such rotations include a preliminary rotation of the article at a station S to approximately the desired rotative position, and a final rotation after the article has reached the decorating station T. The mechanisms for rotating the bottles at the two stations S and T are alike in many respects, so that a detailed description of one will suffice for both.

Each mechanism for rotating the bottles comprises a chuck 97 for engaging the base of a bottle, and a holding device 98 for holding the bottle against the chuck. The holding device 98 includes a head chuck or chuck center 99 carried on an arm 100 on a slide block 101 mounted to reciprocate in guides 102 supported on the conveyor frame 66. The mechanism for reciprocating the slide blocks at the stations S and T includes a cam 103 (Fig. 9) formed on the periphery of a cam disk 104 carried on a shaft 105 by which the cam disk is rotated continuously. The shaft 105 (see Fig. 3) is driven from the motor 26 through speed reduction gearing. The cam 103 actuates a bell crank 106 connected through a rod 107 with a rock arm 108 on a rock shaft 109. The rock shaft operates through rock arms 110 and links 111 to reciprocate the slide blocks 101 and parts carried thereby.

When a bottle has been brought to the initial registration station S, the cam 103 operates to grip the bottle between the chuck center 99 and the chuck 97. The chuck at the station S is intermittently rotated through mechanism shown in Fig. 6 including a friction clutch 112, the construction of which is the same as that of a clutch 112ª (Fig. 5) at the decorating station T. Each of the said clutches includes a continuously rotating disk 113 mounted to rotate about the axis of a clutch shaft 114. The said disk for the clutch 112 is driven through a sprocket and chain 115, the latter driven by a sprocket wheel 116 (Fig. 9) on a shaft 117 geared to the drive shaft 31. The clutch 112 includes a disk 118 (see Fig. 5) secured to the chuck shaft 114 and adapted to be moved into and out of frictional engagement with the clutch disk 113 by lengthwise movement of the clutch shaft 114. The clutches 112 and 112ᵃ are under the control of electromagnets 119 (Fig. 5) individual thereto. Each electromagnet comprises a solenoid connected to a bell crank lever 120 which in turn is connected to a lever 121 (see Fig. 6) fulcrumed at 122 and connected to move the chuck shaft 114 lengthwise. When the solenoid is energized it operates through the connections just described to move the friction disk 118 into frictional contact with the rotating disk 113, thereby rotating the chuck 97 and the bottle held thereby.

Each of the bottles C is formed with a projection or boss a (see Figs. 15 and 17) which determines the positions to which the bottle is rotated during the registration operations at the stations S and T, said boss serving to actuate a switch for the circuit of the electromagnet 119 which controls the clutch for the rotating chuck. The switches controlled by the lug a, as more fully set forth hereinafter, are carried in finger mechanisms 125. As shown in Fig. 12, one such finger mechanism is provided at each of the stations S and T. These finger mechanisms are actuated by cams 126 and 126ᵃ (Figs. 5 and 9) mounted on the drive shaft 31. Operating connections from the cam 126 to the finger mechanism actuated thereby, include a rock arm 127 (Fig. 5) secured to a rock shaft 128 and carrying a cam roll running on the cam 126. An arm 129 extending forward from the rock shaft 128, is connected through a link at its forward end to a rock arm 130 on a rock shaft 131 (Figs. 5, 12 and 15). The rock shaft 131, as shown in Fig. 12, extends to the finger mechanism 125 at the decorating station T. The cam 126ᵃ has substantially similar operating connections including a rock shaft 131ᵃ, extending to the finger mechanism 125 at the registration station S.

The construction and operation of the finger mechanism 125 will be understood by reference to Figs. 15, 16 and 17. This mechanism is pivotally mounted by a pintle 134, on an arm or bracket 132 formed with a hub or collar 133 (Figs. 5 and 15) by which the bracket is mounted for rotative adjustment about the axis of the chuck 97 as hereinafter described. The finger is adapted to swing about the pivot 134 from its retracted position (Fig. 15) to a position to cooperate with the lug a. The swinging finger comprises relatively movable parts or sections including a base plate or body 135 and a substantially cross shaped plate 136 pivotally connected thereto by a horizontally disposed pivot 137 transverse to the pintle 134. A finger piece 138 in the form of a casing or box containing the switch, is adjustably mounted on the plate 136 by means of clamping bolts 139, the heads of which engage a horizontal guideway 136ᵃ in the plate 136. Such adjusting means permits the finger piece 138 to be adjusted horizontally to positions corresponding to the size of any article within the range of the circles C¹ and C², Fig. 17. The rock shaft 131 carries a rock arm 140 which is connected through a link 141 to a short arm 142 on a rock shaft 143 to which is attached a lug 144 extending at right angles to the arm 142. The rock shaft 143 is mounted in the plate 135 and the lug 144 projects across the plate 136, closely adjacent to a vertical surface 145 thereof (Fig. 17). A pair of coil springs 146, each anchored at one end to the bracket 132 and at the opposite end to the plate 135, place a spring tension on the finger mechanism, tending to swing it from its retracted position (Fig. 15) to its vertical or operative position (Fig. 16). Such swinging movement is controlled by the cam actuated rock shaft 131. When the latter is rocked in a clockwise direction (Fig. 15) under the control of the cam 126, the finger swings to a vertical or operative position at which it is arrested by the engagement of a nose 147 on the plate 135, with a shoulder 148 on the bracket 132.

The switch mechanism within the hollow finger or casing 138 includes a pair of switch contacts 150, one of which is carried on a contact lever 151 fulcrumed at 152 (Fig. 18). The lever 151 is actuated by a spring 153 for holding the switch contacts together. Means for separating the switch contacts, under the control of the lug a, includes a switch lever 154 fulcrumed at 155 on the finger 138, said lever carrying a pin 156 which engages the contact lever 151. The switch lever has at its upper end a lateral extension 157 arranged to overlie a contact pin 158 which extends loosely through an opening formed in a lateral extension 159 on the upper end of the finger piece 138. When the finger is in its operative position the contact pin 158 is adapted to bear against the periphery of the bottle C, in the path of the lug a, so that when the bottle has rotated to a predetermined position the lug a engages the contact pin and actuates the switch lever 154, thereby separating the switch contacts 150 and opening the circuit of the electromagnet 119 which controls the clutch 112 (Fig. 6). When the electromagnet is deenergized it operates through the connections including the levers 120 and 121 to draw the clutch shaft 114 and friction disk 118 to the right (Fig. 5), thereby disengaging the clutch members 113 and 118 and moving the friction disk 118 into frictional engagement with a plate 160 which operates as a friction brake to quickly stop the rotation of the chuck and the bottle.

Referring to Figs. 15 to 17, the pivotal mounting of the plate 136 for movement about the pivot 137 assists in positioning the finger relative to the bottle, as will now be described. During the swinging movement of the finger about the pivot 134 from the Fig. 15 position to the Fig. 17 position, the plate 136 is held in the position shown in dotted lines (Fig. 17) relative to the plate 135, so that the finger and contact pin 158 are held laterally outward beyond the periphery of the bottle permitting them to clear the bottle. The plate 136 is held in such dotted line position by the lug 144 bearing against the surface 145. It will be noted that during this swinging movement of the finger the pull of the springs 146 reacts through the pivot pin 143 and lug 144 to maintain said pressure of the latter against the surface 145. In other words, the tension of the springs is equivalent to a pull on the link 141 (Fig. 16) tending to rock the shaft 143 in a clockwise direction and thereby causing the lug 144 to bear against the plate 136. When the finger has been brought to operative position at the side of a bottle with the stop 147 against the shoulder 148, the final rocking movement of the shaft 131 operates to move the lug 144 out of contact with the plate 136. A spring 161 interposed between the plates 135 and 136, then swings the plate 136 to the full line position (Fig. 17), thereby bringing the finger extension 159 and the contact pin into operative position in contact with the bottle.

When the lug $a$ actuates the switch lever, as above described, to separate the switch contacts, a catch 162 (Fig. 18) actuated by a spring 163, snaps over the end of the switch lever so that the contacts 150 are held apart. When the finger is again swung back to inoperative position (Fig. 15) a trigger 164 engages a lug 165 on the bracket 132 and releases the catch 162 so that the switch lever is reset and the switch contacts closed for the succeeding operation.

The finger-carrying brackets 132 are rotatively adjustable about the axis of the chuck as above noted, for the purpose of rotatively adjusting the finger mechanism and thereby adjustably varying the registration position of the bottle, thus permitting a decoration to be applied at any desired position circumferentially of the bottle. Separate adjusting mechanisms are provided for the finger devices at the stations S and T, as shown in Fig. 12, each adjusting mechanism having an arm 166 pivoted to a sleeve 167 screw threaded on a rod 168 on which is a beveled pinion 169 operatively connected with a hand wheel (not shown) for rotating the shaft 168 and thereby rocking the finger about the axis of the chuck to the desired position of adjustment.

Fig. 13 shows an arm 166 attached to the finger device in a different position, sockets 170 being provided in either of which the arm 166 may be mounted. This, in combination with the adjustment by means of the rod 168, permits a wide range of adjustment.

When the lug $a$ operates to open the electrical circuit so that the clutch is released and the friction brake applied, as heretofore described, the bottle may coast or may be rotated by its momentum a short distance before being brought to rest. In order to return the bottle to its exact position for registration at the decorating screen, final rotation in a clockwise direction is effected after the bottle reaches the decorating station T. This final rotation is under the control of the finger mechanism 125 at the latter station and is effected in substantially the same manner as the first rotation except that the bottle is rotated in the reverse direction and at a comparatively low speed, which prevents any appreciable over-running when the clutch is again released and the friction brake applied. The clutch disk 113 at the station T is driven from the shaft 105 (Figs. 3 and 5) which operates through bevel gears 181, a shaft 182 and a sprocket gear and chain drive 183.

After the final registration, the decorating mechanism is brought into operation. This mechanism includes the silk screen 10 mounted on a screen frame 185 (Figs. 1 and 3) which overlies the bottle at the decorating station. The screen is advanced lengthwise while in contact with the bottle and the latter is simultaneously rotated by means presently to be described. At the same time, a squeegee 186 overlying the screen operates in a conventional manner to force the color material through the design in the screen.

The screen frame and mechanism actuating it are supported on a framework comprising a supporting beam 187 (Figs. 1, 2 and 12) extending lengthwise of the decorating machine and mounted on standards 188, said framework surmounting and forming a part of the framework 25. The screen frame 185 (see Figs. 1 and 2) is carried on arms 189 and is adjustable horizontally lengthwise of the bottles by means of adjusting screws 190 mounted in the arms 189. Said arms are provided at their rear ends with vertical rack bars 191 (Figs. 1, 12 and 14) which are mounted for up and down movement in guideways formed in brackets 192, permitting the screen frame to be adjusted up and down. The adjusting means includes a hand operated worm shaft 193 which drives a worm gear 194 on a shaft 195 journaled in the brackets 192 and carrying pinions running in mesh with the rack bars 191.

The brackets 192 are attached to a slide bar 196 mounted to reciprocate horizontally in guideways 197 formed on the lower side of the channel bar 187, thereby reciprocating the screen frame. The horizontal reciprocating movements of the screen frame are controlled by a cam track 198 formed on the cam disk 104 (See Figs. 3 and 9). A vertical rock shaft 199 is provided at its lower end with a rock arm 200 carrying a cam roll 201 running in the track 198. Attached to the upper end of the rock shaft 199 is a forwardly extending rock arm 202 which has a driving connection with the slide bar 196. Such connection includes a block 203 (Fig. 5) mounted in a guideway 204 extending lengthwise in the arm 202. The block 203 is threaded on an adjusting shaft 206 carrying a hand wheel 207 for adjusting the block lengthwise of the arm. A connecting block 208 pivotally connected with the block 203, is slidable in a guideway formed in a connecting bar 209 attached to the lower face of the bar 196. It will be seen that with this construction oscillating movement of the arm 202 under the control of its cam will impart lengthwise reciprocating movement to the bar 196 and the screen frame connected thereto.

The arm 202 operates through the following mechanism to positively rotate the chuck 97 and the bottle carried thereby while the screen travels back and forth during the decorating operation, the peripheral speed of the bottle being the same as the linear speed of the screen. Pivotally mounted on the under side of the arm 202 is a connector block 210 which engages a channel shaped bar 211 attached to a slide bar 212. The latter is mounted to reciprocate lengthwise of the machine in a guideway formed in a stationary support 213. The slide bar 212 is provided on its lower face with a rack engaging a pinion 214 formed on the clutch disk 160. The clutch disk 118 being in frictional engagement with the disk 160 during the decorating operation, the chuck 97 is rotated concomitantly with the movement of the decorating screen, both being operatively connected to and driven by the rock arm 202.

The squeegee 186 is carried on an arm 215, being connected thereto by a clamping head 216 which permits adjustment of the squeegee lengthwise of the arm and also vertically in said clamping head. The arm 215 is mounted by a pivot pin 217 on a supporting bracket 218, the latter having a limited vertical movement on a stationary bracket 219. The squeegee is held with a yielding pressure against the decorating screen by means shown in Fig. 8. Such means includes a lever 220 fulcrumed on the pivot pin 217 and connected to the squeegee arm 215 by means of a lug 221 adapted to engage a notch 222 in the lever 220. A coil spring 223 mounted in a tubular housing 224 engages a nut 225 threaded on a rod 226 and operates through said rod and the lever 220 to apply a downward pressure to the squeegee. The nut 225 is adjustable lengthwise of the rod to adjustably vary the pressure applied to the squeegee. The connecting lug 221 is attached to a rod 227 (Fig. 3) provided with a handle 227ª by which the lug may be withdrawn, permitting the squeegee arm to be swung upward to the dotted line position (Fig. 8) and held in such position by engagement of the lug with a second notch 222ª. During the horizontal movement of the screen, the squeegee holds it against the article C with a yielding pressure. While the screen is at rest during the indexing of the cradle conveyor and during the indexing rotation of the bottles, the squeegee is held away from the screen by means of a cam 228 (Fig. 12) mounted on the shaft 78. The cam operates through a bell crank 229 which comprises a horizontally disposed arm 230, the free end of which engages beneath the bracket 218 which carries the squeegee arm.

In order to hold the squeegee in its lifted position in the event of an empty cradle being presented at the decorating station, the following mechanism is provided. A vertical rod 231 (Figs. 3 and 5) is attached at its lower end to the bracket 218 and extends upwardly into a casing 232 within which is mounted an electromagnet 233. A rod 234 attached to the core of the electromagnet, is adapted to be projected into a notch 235 formed in a head 236 on the vertical rod 231. This takes place while the rod 231 is in its lifted position and when the electromagnet is energized. The bracket 219 which carries the squeegee is held in its up position while a bottle C is brought to the decorating station by the indexing movement of the cradle carrier. The arm 100 carrying the chuck center 99 is then moved forward in the manner heretofore described to engage the bottle. A switch in circuit with the electromagnet 233, is mounted in a switch box 238 carried on the arm 100 (see Figs. 3 and 4). When the chuck center 99 engages a bottle and is arrested thereby the continued forward movement of the arm 100 relative to the chuck center causes a pin 239 carried by the chuck stem 240 to be projected to the dotted line position within the switch box, thereby actuating the switch lever 241 and separating the switch contacts 242, thus breaking the circuit of the electromagnet 233. The electromagnet being thus deenergized the pin 234 is retracted, thereby releasing the rod 231 so that the squeegee can move downward to operative position to bear against the screen during the decorating stroke. After the decorating operation the chuck center 99 is withdrawn, thereby reestablishing the circuit through the switch contacts 242 so that when the squeegee is again lifted and the rod 231 moved upward the electromagnet 233 again operates to engage the head 236. In the event an empty cradle is presented at the decorating station the chuck center 99 retains its projected position when the arm 100 is advanced, so that the switch within the box 238 remains closed and the electromagnet 233 remains energized, with the result that the squeegee is held in its lifted position during the decorating movement of the screen.

A timing device shown in Figs. 9, 10 and 11 includes a switch in the circuits of the electromagnets 119 which actuate the clutches and the electromagnet 233 (Fig. 3). The timing switch comprises contacts 256 and a switch lever 257 actuated by a cam 258 on a shaft 259 carrying a sprocket wheel 260 driven from the drive shaft 31 through a chain 261. The cam is made in sections individually adjustable rotatively and held in adjusted position by clamping nuts 262. This construction permits the times for opening and closing the switch to be separately adjusted.

After the bottles pass beyond the decorating station they are swung to an upright position and placed upon the unloading conveyor I in the manner heretofore described. This conveyor is driven continuously by the drive shaft 31 (see Figs. 9 and 1), said shaft carrying a sprocket wheel 243 driving a chain 244 geared to the conveyor I. As the bottles move rearwardly they are deflected from the conveyor I by means of a cam arm 245 onto the endless conveyor J (Fig. 24) by which they are carried in a tortuous or zigzag path through the drying oven K. The ink or coloring material applied by the decorating unit H is thus dried before the bottles are brought to the second decorating station. After passing through the drying oven the articles are transferred to a second loading conveyor L and from thence to the cradle conveyor M which operates in the same manner as the cradle conveyor G to move the articles step by step along the decorating unit N. The latter is substantially the same in construction and operation as the unit H, so that the articles are again rotated by registration mechanism to a predetermined position and a second color is then applied. The articles are then advanced to the lehr P, as heretofore described, for the usual firing operation, by which the decorating material is glazed or fused into the surface of the article.

Means for supplying ink or coloring material to the decorating screen, as shown in Figs. 3, 25 and 26, includes a pump 246. The material is supplied from a tank 247 and conveyed therefrom through a pipe 248 to the pump. The latter includes a piston 249 which reciprocates within the cylinder 250. The piston is moved in one direction by an arm 251 (Figs. 1 and 25) mounted on the rock arm 202. The piston is moved in the reverse direction by a coil spring 252. Check valves 253 and 254 (Fig. 26) prevent back flow of the material in the inlet pipe 248 and the pipe 255, respectively. The pipe 255 conducts the material from the pump to the decorating screen. The pump is mounted on the bar 187 for adjustment lengthwise thereof by means of an adjusting screw 255ª and held in adjusted position by a set screw 255ᵇ. This permits the length of stroke of the pump piston to be adjusted to regulate the output of the pump.

Although we have herein shown and described the apparatus as adapted for applying two colors to the cylindrical surfaces of bottles, it will be understood that the apparatus might readily be adapted for applying more than two colors, or for decorating various other articles.

Modifications may be resorted to within the spirit and scope of our invention.

We claim:

1. Apparatus for decorating articles comprising in combination, a decorating unit, a conveyor on which articles are automatically advanced to said unit, a loading device for loading articles onto the conveyor, a second decorating unit, automatic means for transferring the articles from the first unit to said second unit, each said unit comprising means for applying a color design to the articles, and automatic means for rotating the articles to predetermined positions of registration prior to each application of the color design.

2. Apparatus for decorating articles comprising decorating means, a cradle conveyor, cradles thereon, loading mechanism for automatically placing articles on the cradles, and means for advancing the cradle conveyor step by step and thereby bringing the articles seriatim to decorating positions, said loading mechanism including a continuously traveling loading belt, means for placing the articles in upright position thereon, and means for tilting the cradles into position to receive the articles from the loading belt.

3. Apparatus for decorating articles comprising decorating means, a cradle conveyor, cradles thereon, loading mechanism for automatically placing articles on the cradles, and means for advancing the cradle conveyor step by step and thereby bringing the articles seriatim to decorating positions, said loading mechanism including a continuously traveling loading belt, a loading conveyor, a star wheel, means for driving the loading conveyor, a selector device for directing the articles to the star wheel, said star wheel operable to transfer the articles to the loading belt, and means for tilting the cradles into positions to receive the articles from the loading belt.

4. Decorating apparatus comprising the combination of a cradle conveyor, a series of article holding cradles mounted thereon, means for driving the conveyor step by step and thereby bringing said cradles in succession with the articles therein, to a decorating station, a decorating screen at said station, means for rotating each article to an approximate registration position on its cradle before it reaches the decorating station, means for further rotating each article to a predetermined position while at the decorating station to effect a desired registration of the article with the screen, and means to thereafter effect a further rotation of the article and simultaneously apply a design to the surface of the article.

5. Decorating apparatus comprising the combination of a cradle conveyor, a series of article holding cradles mounted thereon, means for driving the conveyor step by step and thereby bringing said cradles in succession with the articles therein, to a decorating station, a decorating screen at the decorating station, a chuck arranged to engage an article within a cradle at said station, driving means for rotating the chuck and thereby rotating the article at said station, means for advancing the screen over the surface of said article during said rotation, means cooperating with the screen for decorating the surface of the article during said rotation, a second driving means for the chuck, and means cooperating therewith for imparting a preliminary rotation to the article at said station by which it is brought into a desired rotative position of registration with the screen prior to said decorating operation.

6. Apparatus for decorating articles, comprising a horizontally disposed endless conveyor, cradles carried on said conveyor and each adapted to hold an article to be decorated, a decorating screen, means for intermittently driving the conveyor and thereby advancing each cradle with an article therein to a plurality of stations including a registration station and a decorating station, a chuck at said registration station, means for engaging it with an article at said registration station, automatic means for rotating the chuck and the article held thereby to an approximate registration position, a second chuck at the decorating station, means for causing it to rotate each article at the decorating station to an exact predetermined position of registration with the decorating screen, means for thereafter bringing the decorating screen into engagement with the article, means for then causing the surface of the article to roll in contact with the screen, and means cooperating with the screen to apply a decoration to said surface.

7. Apparatus for decorating articles, comprising a decorating screen, means to cause an article to roll along the screen, means cooperating with the screen for applying a color decoration to the surface of the article while in rolling contact with the screen, and registration means by which the article is rotated to a predetermined position for registration with the screen prior to the decorating operation, said registration means including mechanism for rotating the article in one direction to an approximate registration position, and means for thereafter rotating the article in the reverse direction to an exact registration position.

8. Apparatus for decorating articles, comprising a decorating screen, means to cause an article to roll along the screen, means cooperating with the screen for applying a color decoration to the surface of the article while in rolling contact with the screen, and registration means by which the article is rotated to a predetermined position for registration with the screen prior to the decorating operation, said registration means including a chuck arranged to engage the article, driving means for the chuck, a clutch for connecting the chuck with the driving mechanism, and automatic means for actuating the clutch and releasing the chuck from the driving mechanism when the article has been rotated to a predetermined position, said registration means including automatic means for rotating the article in the reverse direction through a comparatively short distance sufficient to compensate for any overrunning of the article after said release of the chuck, thereby bringing the article to an exact predetermined rotative position for registration with the decorating means.

9. Apparatus for decorating articles, comprising the combination of a decorating machine, registration mechanism for rotating an article to a predetermined position prior to a decorating operation, said registration mechanism including a chuck to engage and rotate the article, means for driving the chuck, a clutch between the chuck and its driving means, an electromagnet for actuating the clutch, a switch in the circuit of said electromagnet, and means operated by the article held by the chuck to actuate said switch when the article reaches a predetermined position of rotation and thereby cause the electromagnet to release the clutch and stop the rotation of said article.

10. Decorating apparatus comprising means for applying a decoration of predetermined design to the surface of an article, mechanism for rotating the article to a predetermined position of registration prior to the decorating operation, said registration mechanism including a chuck, means for holding an article on the chuck, driving means for the chuck, a friction clutch comprising clutch members connected respectively to the chuck and its driving means, an electromagnet, a switch in the circuit of the electromagnet, a finger carrying said switch, said switch including a switch lever, a contact pin for actuating the lever, automatic means for swinging said finger to an operative position in which said contact pin projects into the path of a projection formed on the article held by the chuck, said projection operative to engage said contact pin when the article has reached a predetermined position of rotation and cause the pin to actuate the switch lever and open the circuit of the electromagnet, and means controlled by the electromagnet and brought into operation when the circuit is broken, to disengage the clutch members and cause the chuck and article held thereby to come to rest.

11. Decorating apparatus comprising means for applying a decoration of predetermined design to the surface of an article, mechanism for rotating the article to a predetermined position of registration prior to the decorating operation, said registration mechanism including a chuck, means for holding an article on the chuck, driving means for the chuck, a friction clutch comprising clutch members connected respectively to the chuck and its driving means, an electromagnet, a switch in the circuit of the electromagnet, a finger carrying said switch, said switch including a switch lever, a contact pin for actuating the lever, automatic means for swinging said finger to an operative position in which said contact pin projects into the path of a projection formed on the article held by the chuck, said projection operative to engage said contact pin when the article has reached a predetermined position of rotation and cause the pin to actuate the switch lever and open the circuit of the electromagnet, means controlled by the electromagnet and brought into operation when the circuit is broken, to disengage the clutch members, and a friction brake brought into activity by the separation of the clutch members to apply a braking action to the chuck.

12. In apparatus for decorating articles, the combination with means for applying a decoration to the surface of an article, of registration mechanism for rotating the article to a predetermined position prior to the decorating operation, said registration mechanism including a chuck, means for engaging the chuck with an article, electro-responsive means controlling the rotation of the chuck, a switch in the circuit of said electro-responsive means, a finger in which said switch is mounted, a bracket on which the finger is pivotally mounted, a switch operating device carried by said finger, and automatic means for swinging said finger into a position in which said switch operating device extends into the path of a projection on the article carried by the chuck, said supporting bracket being mounted for rotative adjustment about the axis of the chuck.

13. Apparatus for decorating articles comprising a decorating screen, a carrier for said screen mounted for horizontal rectilinear reciprocating movement, a vertical rock shaft, a horizontal rock arm fixed to the rock shaft and operatively connected to said carrier, and cam mechanism for intermittently rocking said shaft and rock arm horizontally about the vertical axis of said shaft and thereby imparting rectilinear movement to said carrier and screen.

14. Apparatus for decorating articles comprising a decorating screen, a carrier for said screen mounted for horizontal rectilinear reciprocating movement, a vertical rock shaft, a horizontal rock arm fixed to the rock shaft and operatively connected to said carrier, and cam mechanism for intermittently rocking said shaft and rock arm horizontally about the vertical axis of said shaft and thereby imparting rectilinear movement to said carrier and screen, a chuck for holding an article to be decorated, driving means for rotating the chuck interconnected with the said cam mechanism, said chuck operable to rotate the article while in rolling contact with the screen and at the same surface speed as the screen.

15. Decorating apparatus comprising a conveyor, article holding devices on said conveyor, means for driving the conveyor and bringing said holding devices in succession with articles thereon to a decorating station, decorating means including a screen to overlie an article at said station, a squeegee positioned over and spaced above said screen, automatic means to lower the squeegee to an operative position in which it engages the screen and holds it against the surface of the article to be decorated, automatic means to impart a decorating movement to the screen while the squeegee is in said operative position, and automatic means for holding the squeegee in an inoperative position during the decorating movement of the screen when an empty holding device is presented at the decorating station.

16. Decorating apparatus comprising a screen, a squeegee spaced above the screen, a cradle carrier, cradles thereon for holding articles to be decorated, means for driving the carrier and thereby bringing the articles in succession to a position beneath the screen for the decorating operation, means for advancing the screen, means for causing the article to roll in contact with the advancing screen, means for lowering the squeegee and causing it to hold the screen against the article during the decorating operation, and thereafter lifting the squeegee, and automatic means for holding the squeegee in its lifted position and causing the screen to advance idly during a decorating operation when an empty cradle is presented at the decorating station.

17. The combination of a decorating screen, a squeegee spaced above the screen, a chuck for holding articles to be decorated, means for bringing the articles in succession to said chuck, a device for holding the articles on the chuck, means for rotating the chuck, means for lowering the squeegee against the screen, an electromagnet, a switch in circuit with the electromagnet, means controlled by said electromagnet for holding the squeegee in its lifted position, and means cooperating with the article holding means to actuate said switch and causing the squeegee to be held in its lifted position when an empty cradle is presented at the decorating station.

18. Apparatus for decorating the round surfaces of round articles, comprising a decorating unit, a drying oven, a second decorating unit, each said unit including means for applying a decorating material to the articles, automatic means for transferring articles from the first unit through said oven to said second unit, each said unit being adapted to receive the articles in any rotative position, and automatic means associated with each said unit for rotating the articles about a stationary axis from the position in which they are received at said unit to a predetermined rotative position for registration with the decorating means.

19. Apparatus for decorating articles comprising a decorating unit, a cradle conveyor, cradles on said conveyor to receive the articles, means for advancing the cradle conveyor step by step and thereby advancing the articles step by step to a decorating station, a chuck at said station to engage the articles, automatic means for rotating the chuck and thereby rotating the articles while on the cradles to predetermined positions of registration with the decorating unit, said rotating means including a drive shaft and a clutch between the drive shaft and the chuck, an electromagnet controlling the clutch, automatic means for causing the electro-magnet to release the clutch when an article has been rotated to said position of registration, and automatic means for applying color designs in positions on said articles determined by said rotations.

20. Apparatus for decorating articles, comprising in combination a decorating unit, an article holding conveyor, means for driving the conveyor and automatically advancing articles thereon to said unit, a second decorating unit, automatic means for transferring the articles from the first unit to the second unit, each said unit comprising means for applying a surface decoration to the articles, and automatic means associated with each unit for rotating each article about a stationary axis at said unit to a predetermined position of registration prior to each said decoration.

21. Apparatus for decorating articles, comprising a holding device for engaging the articles in succession and holding them, a decorating device, means for rotating the holder and thereby rotating an article held thereby to a predetermined rotative position for registration with the decorating device, means for bringing the decorating device into cooperative relation with the article, a second means for rotating said holder, and mechanism cooperating with said second means for causing the decorating device to advance over the surface of the article and apply a decoration thereto while the article is being rotated by said second means.

22. Apparatus for decorating articles, comprising a chuck for holding an article, a shaft connected to rotate the chuck, a driving device for rotating the shaft and thereby rotating the article to a predetermined rotative position, automatic means for disengaging said driving device from the shaft when the article is brought to a predetermined position of rotation, a second driving device for rotating said shaft, a decorating screen, means for advancing the screen over the surface of the article while the latter is rotated by said second driving device, and means cooperating with the screen to apply a decoration to said article.

23. Apparatus for decorating articles, comprising an article holding chuck, a shaft connected to rotate the chuck, separate driving devices for said shaft, clutch mechanism for alternatively connecting said driving devices to the shaft whereby an article while held by the chuck is alternatively rotated by said driving devices, means to arrest the article at a predetermined rotative position when rotated by one of said devices, and decorating means for applying a decoration to the article while rotated by the other of said driving devices.

24. Apparatus for decorating articles, comprising an article holding chuck, a shaft connected to rotate the chuck, separate driving devices for said shaft, clutch mechanism for alternatively connecting said driving devices to the shaft whereby an article while held by the chuck is alternatively rotated by said driving devices, said clutch mechanism including a friction disk fixed to said shaft and friction elements connected respectively to said driving devices and adapted to be brought alternatively into frictional engagement with said friction disk, automatic means for actuating the clutch mechanism to disengage one said driving device when the article has been rotated to a predetermined position, and decorating means cooperating with said article for applying a decoration thereto while being rotated by the other said driving device.

25. Apparatus for decorating articles, comprising in combination, a decorating unit, an article holding chuck, automatic means for advancing said articles and causing them to be engaged and held seriatim by the chuck, means for rotating the chuck and the article held thereby, a decorating device, automatic means for moving it into cooperative relation to the article and applying a decoration to the article while the latter is being rotated, an electro-responsive power device for holding said decorating device in an inoperative position, and a switch controlling said power device and actuated by said chuck when an article is held by the chuck, to cause the power device to release the decorating device.

26. Apparatus for decorating articles comprising a decorating unit operable to apply a color design to a round surface of an article at a decorating station, a second decorating unit operable to apply a second color design to said surface of the article at a second decorating station, automatic means for transferring the article from one to the other of said units, means at said second station for automatically rotating the article from any rotative position in which it is received by the second unit, into a predetermined rotative position required for applying the second color design in a predetermined position relative to the first design, said rotating means including an article-gripping device mounted for rotation about a stationary axis at said second station and operable to rotate the article about said stationary axis, and means for automatically arresting the rotation of the article when brought to said predetermined rotative position.

ALBERT JACKSON.
CLARENCE A. HEYNE.